UNITED STATES PATENT OFFICE.

ASHLEY V. BLACK, OF ST. LOUIS, MISSOURI, ASSIGNOR TO GRAIN PRODUCTS COMPANY, OF ST. LOUIS, MISSOURI, A CORPORATION OF DELAWARE.

FOOD PRODUCT.

1,205,320.  Specification of Letters Patent.  Patented Nov. 21, 1916.

No Drawing.  Application filed August 18, 1916. Serial No. 115,593.

*To all whom it may concern:*

Be it known that I, ASHLEY V. BLACK, a citizen of the United States, residing at the city of St. Louis, State of Missouri, have invented a certain new and useful Food Product, of which the following is a specification.

This invention relates to a certain new and useful food product.

Bran, and especially wheat bran, has, as is commonly known, great laxative properties, but is, of and by itself, unpalatable and of little or no food value; but I have found that by intimately associating or mixing with the bran certain constituents of agreeable taste and of known food value, I may provide and furnish to the consuming public at relatively low cost a very palatable and nutritious food product easily digestible and possessing and retaining all the laxative effect or property of bran. And my present invention resides in the production and provision of such a food product having bran as one of its essential ingredients.

In Letters Patent No. 1,186,768, of June 13, 1916, there is described a food product comprising, as its elements, bran and an edible syrup mixed or combined with a previously cooked flour, such as cracker meal. In my present food product, however, I use and combine or mix the bran and edible syrup with what is commercially known as flaked cereal, that is to say, a cereal, such as wheat, rice, corn, or rye, mixed in substantially the whole or greater portion of the grain with such articles as sugar, salt, and syrup, and the mixture then steam cooked or boiled, then rolled out into flake form, and the flakes then toasted or baked, flaked cereal being highly nutritious and easily digested and being substantially different physically from a previously cooked flour, such as cracker meal.

My present food product hence includes, as essential elements or ingredients, bran, preferably wheat bran, a flaked cereal, preferably corn, either in flake or in more finely comminuted form, and an edible syrup, these several ingredients or constituents being combined or mixed, to obtain the best results, in the proportions approximately of thirty-seven and one-half per cent. bran, twenty-five per cent. flaked cereal, and thirty-seven and one-half per cent. edible syrup.

In producing my present food product, and in providing first the edible syrup, I mix together in a suitable receptacle strained honey and a sweet syrup, such as molasses, cane syrup, maple syrup, corn syrup, or the like, in approximately equal parts. I then preferably heat this syrup-mixture until the same is of one relatively thin consistency, so that it will pour easily. I then, also in a suitable receptacle or mechanical mixer, commingle the bran with, say, approximately half the flaked cereal, then pour into the mixer the relatively thin, hot syrup, and then thoroughly and intimately mix the syrup with the bran and flaked cereal. I then add to the mass in the mixer the remainder or half of the flaked cereal, and then again mix the several ingredients intimately together, the syrup, in addition to contributing food value and a pleasant sweet taste to the finished product, serving also as a binder for the bran and flaked cereal, the bran being also in the form preferably of flakes and the flaked cereal being, as stated, either in flake or more finely comminuted form. The mass or mixture is now ready for toasting or baking, but, that the finished product may be conveniently handled and supplied to consumers, I first mold or otherwise form the mass into suitable individual cakes or biscuits. Accordingly, suitable relatively small or individual molds preferably of somewhat rectangular form or shape being provided and at hand, the same are respectively filled with the described thoroughly mixed and combined ingredients, the material in each mold being suitably compactly pressed therein. The several molds so filled are now reversely placed upon a suitable preferably metal toasting surface, the molds duly removed, and the several so formed cakes or biscuits with their supporting toasting surface placed within a suitable oven, under the heat of which, as a temperature of approximately 300° F., the several cakes or biscuits are permitted to remain a suitable length of time, approximately thirty minutes, the several cakes or biscuits being thereby baked or toasted, thoroughly sterilized, and relatively hardened. On being removed from the oven, the several food-cakes or biscuits are suitably cooled and are then ready for consumption, my new food-cakes or biscuits being preferably packed and wrapped for shipment in suitable containers, cartons, or the like.

My new food cakes or biscuits are delightfully pleasant to the taste, exceedingly nutritious and nourishing, easily digested, of high laxative value, and may be manufactured and produced and furnished to consumers at relatively low cost.

Having thus described my invention, what I claim and desire to secure by Letters Patent is:

1. As a new article of manufacture, the edible biscuit or cake herein described, the same being composed only of bran, a flaked cereal, and a syrup, intimately mixed together and compactly molded into cake or biscuit form.

2. As a new article of manufacture, the edible toasted cake or biscuit herein described, the same being composed only of bran, a flaked cereal, and a syrup, intimately mixed together, compactly molded into cake or biscuit form, and toasted.

3. As a new article of manufacture, the edible toasted cake or biscuit herein described, the same being composed only of bran, flaked corn, and a syrup, intimately mixed together, compactly molded into cake or biscuit form, and toasted.

4. A manufactured toasted food product composed of bran, flaked corn, honey, and molasses.

5. A manufactured toasted food product composed of bran, a flaked cereal, and an edible syrup, all intimately mixed together in the proportions approximately of thirty-seven and one-half per cent. bran, twenty-five per cent. flaked corn, and thirty-seven and one-half per cent. edible syrup.

In testimony whereof, I have signed my name to this specification.

ASHLEY V. BLACK.